(12) United States Patent
Roers et al.

(10) Patent No.: US 8,592,623 B2
(45) Date of Patent: Nov. 26, 2013

(54) METHOD FOR PRODUCING POLYESTER POLYOLS HAVING LOW AMOUNTS OF DIOXANE WASTE

(75) Inventors: Rolf Roers, Odenthal (DE); Hartmut Nefzger, Pulheim (DE); Erika Bauer, Jüchen (DE); Johannes Van De Braak, Hennef (DE); Torsten Heinemann, Leichlingen (DE); Jürgen Schloβmacher, Bergheim (DE)

(73) Assignee: Bayer MaterialScience AG, Leverkusen (DE)

( * ) Notice: Subject to any disclaimer, the term of this patent is extended or adjusted under 35 U.S.C. 154(b) by 181 days.

(21) Appl. No.: 13/127,300

(22) PCT Filed: Nov. 3, 2009

(86) PCT No.: PCT/EP2009/007852
§ 371 (c)(1),
(2), (4) Date: Jun. 8, 2011

(87) PCT Pub. No.: WO2010/051962
PCT Pub. Date: May 14, 2010

(65) Prior Publication Data
US 2011/0236671 A1     Sep. 29, 2011

(30) Foreign Application Priority Data

Nov. 6, 2008  (DE) .......................... 10 2008 056 148

(51) Int. Cl.
*C08G 63/20*  (2006.01)
*C07C 69/54*  (2006.01)

(52) U.S. Cl.
USPC ................... 560/90; 560/89; 560/91; 560/92; 560/98; 560/103; 560/112

(58) Field of Classification Search
USPC .................... 560/89, 90, 91, 92, 98, 103, 112
See application file for complete search history.

(56) References Cited

U.S. PATENT DOCUMENTS

| 4,546,169 A * | 10/1985 | Chandler et al. ............... 528/272 |
| 6,359,022 B1 * | 3/2002 | Hickey et al. .................. 521/114 |
| 2005/0227100 A1 * | 10/2005 | Brandenburger et al. .... 428/480 |

FOREIGN PATENT DOCUMENTS

JP     2003128767 A *  5/2003  ........... C08G 63/127

OTHER PUBLICATIONS

English Translation of Document N.*
Houben-Weyl, Methoden der Organischem Chemie, vol. XIV/2, Makromolekulare Stoffe, Thieme Verlag Stuttgart, ed. E. Mueller, pp. 1-47, 1963.

* cited by examiner

*Primary Examiner* — Michael L Leonard
(74) *Attorney, Agent, or Firm* — Robert S. Klemz; Lyndanne M. Whalen

(57) ABSTRACT

Polyester polyols are produced from at least one carboxylic acid hydride and diethylene glycol by a process in which the formation of 1,4-dioxane is suppressed. These polyester polyols are useful for producing polyurethane (PUR) and polyisocyanurate (PIR) foams and metal composite elements containing these PUR or PIR foams.

10 Claims, No Drawings

METHOD FOR PRODUCING POLYESTER POLYOLS HAVING LOW AMOUNTS OF DIOXANE WASTE

This application is a U.S. National Phase application under 35 U.S.C. §371 of PCT Application No. PCT/EP2009/010457, filed 11/03/2009, which claims priority under 35 U.S.C. §119 (a)-(d) of German Patent Application No. 102008056148.7, filed 11/06/2008.

The present invention relates to the production and use of polyester polyols synthesised from at least one carboxylic anhydride and diethylene glycol, the formation of 1,4-dioxane from diethylene glycol being largely suppressed by means of a special reaction control.

Polyester polyols are an important constituent of many foamed and non-foamed polyurethane systems. The vast majority of polyester polyols that are used to form polyurethanes have hydroxyl end groups that are available for a further reaction with isocyanate groups. The molar mass of polyester polyols is typically in the range from 200 to 5000 daltons. They are produced predominantly by polycondensation of polycarboxylic acids, in particular dicarboxylic acids, and polyols, in particular diols, by reacting carboxyl and hydroxyl groups under dehydrating conditions to form ester groups. Anhydrides of polycarboxylic acids, for example phthalic anhydride, can also be used as an alternative.

Dehydrating conditions can be achieved for example by application of a vacuum, by blowing out the reaction water with an inert gas flow or by azeotropic purging with an entraining agent (Houben-Weyl, Methoden der organischen Chemie, vol. 14/2, Makromolekulare Stoffe, Thieme Verlag Stuttgart, ed. E. Müller, p. 1-47, 1963).

It is known to the person skilled in the art that in the esterification of aromatic phthalic acid, mostly used in the form of phthalic anhydride, with diethylene glycol, 1,4-dioxane forms as a by-product in an undesirable manner. In the case of production in industrial installations the dioxane that is formed is discharged along with the reaction water and must then be broken down in sewage treatment plants, for example, or incinerated after being concentrated. This additional process step increases the costs of polyester polyol production.

The 1,4-dioxane that is formed as a by-product also serves to reduce the yield of the desired product, as part of the diethylene glycol that is used is not incorporated into the polyester that is formed but instead is removed from the reaction mixture as described above in the form of 1,4-dioxane. The formation of 1,4-dioxane thus gives rise to a serious economic disadvantage.

Furthermore, the amount of 1,4-dioxane that a production installation is permitted to produce can be restricted by permit conditions. In such cases the restriction of the amount of dioxane thus leads indirectly to a restriction of the production capacity of an installation for producing polyester polyols.

An object of the present invention is therefore to provide a process for producing polyester polyols synthesised from at least one carboxylic anhydride and diethylene glycol which overcomes the disadvantages of the prior art.

An object of the present invention is in particular to restrict the amount of dioxane generated, relative to the amount of diethylene glycol used, in the production of polyester polyols from at least one carboxylic anhydride and diethylene glycol. In this way the amount of dioxane can be restricted to less than 7 g per kg, preferably to less than 5 g per kg, of diethylene glycol used.

A further object of the present invention is to reduce the amount of dioxane generated, relative to the amount of polyester polyol formed, in the production of polyester polyols from at least one carboxylic anhydride and diethylene glycol. In this way the amount of dioxane can be restricted to less than 4 g per kg, preferably to less than 3 g per kg, of polyester polyol formed.

The aforementioned object is achieved by a process for producing polyester polyols, wherein in a step
a) at least one carboxylic anhydride (A) and diethylene glycol (B) are mixed together and reacted,
   wherein the molar ratio of components (B) to (A) is in the range from 1.5 to 1.0 to 0.7 to 1.0 and the proportion of components (A) and (B) relative to the weight of all components of the mixture is in the range between 66 and 90 wt. %,
and in a step
b) diethylene glycol (B) is added to the polyester polyol from step a),
wherein the polyester polyol from step a) has a higher molar mass than the polyester polyol from step b),
characterised in that in step a) at least one further $C_2$-$C_4$ glycol (C), excluding diethylene glycol, and at Least one aliphatic $C_5$-$C_{12}$ dicarboxylic acid (D) or at least one $C_5$-$C_{10}$ glycol (E) and at least one $C_4$ dicarboxylic acid (F) are added.

The amounts of components (C), (D), (E) and (F) in step a) are chosen such that the amounts of all components (A), (B), (C) and (D) or (E) and (F) in the mixture add to 100 wt. %.

In a preferred embodiment the carboxylic anhydride (A) is aromatic.

The carboxylic anhydride (A) is preferably selected from the group consisting of phthalic anhydride, trimellitic anhydride and pyromellitic anhydride. The carboxylic anhydride is particularly preferably phthalic anhydride.

By exchanging small amounts of aromatic dicarboxylic acids for an equivalent amount of an aliphatic dicarboxylic acid (D or F) and exchanging small amounts of diethylene glycol for equivalent amounts of the glycols (C) or (E), the amount of dioxane waste arising in the production of polyester polyols is reduced far beyond the extent that would be anticipated as a result of the dilution effect. The properties of the polyester polyol that is produced remain virtually the same, in other words polyester polyols produced by the process according to the invention have the same properties as corresponding polyols produced without the addition of aliphatic dicarboxylic acids (D or F) and without the addition of the glycols (C) or (E).

The $C_2$-$C_4$ glycol (C) is preferably selected from the group consisting of ethylene glycol, 1,3-propanediol, 2-methyl-1,3-propanediol, 1,2-propanediol. The $C_2$-$C_4$ glycol (C) is particularly preferably ethylene glycol.

The aliphatic $C_5$-$C_{12}$ dicarboxylic acid (D) is preferably selected from the group consisting of glutaric acid, adipic acid, pimelic acid, suberic acid, azelaic acid, sebacic acid, undecanedioic acid and dodecanedioic acid. Adipic acid or sebacic acid is particularly preferred as the $C_5$-$C_{12}$ dicarboxylic acid (D).

The $C_5$-$C_{10}$ glycol (E) is preferably selected from the group consisting of 1,5-pentanediol, 3-methyl-1,5-pentanediol, 1,6-hexanediol and 1,8-octanediol. The $C_5$-$C_{10}$ glycol (E) is particularly preferably 3-methyl-1,5-pentanediol or 1,6-hexanediol.

The $C_4$ dicarboxylic acid (F) is preferably selected from the group consisting of succinic acid, fumaric acid and maleic acid. The $C_4$ dicarboxylic acid (F) is particularly preferably succinic acid.

The addition of the diethylene glycol (B) in step b) and equilibration to the polyester equilibrium preferably take place in such a way that the distribution of the individual oligomers of the polyester polyol corresponds to the Flory oligomer distribution function (P. J. Flory, Principles of Polymer Chemistry, Cornell University Press, Ithaca 1953, page 317 ff). Polyester polyols of a given type that are in Flory equilibrium always have the same oligomer distribution and thus give rise to consistent material properties with regard to the polyurethane materials produced from them.

The addition of the diethylene glycol (B) takes place in step b) at any temperature of both the intermediate from step a) and the diethylene glycol to be added. The diethylene glycol to be added is preferably at a temperature from room temperature to 60° C., the intermediate from step a) at an elevated temperature of 120 to 200° C. Under laboratory conditions the diethylene glycol (B) is added in a nitrogen counterflow, under industrial conditions it is preferably drawn into the reactor by application of a vacuum. The amount of diethylene glycol (B) to be added is determined from the OH value of the product from step a) and the OH value of the desired end product as well as from the batch size, in accordance with formula (1) below:

$$\text{Amount of diethylene glycol }(B)\text{ to be added in }g=(Z-Y)*M/(1053-Z) \quad (1)$$

in which:
Z denotes the target OH value after step b),
Y denotes the found OH value from step a),
M denotes the amount of polyester polyol from step and
the value 1053 corresponds to the OH value of diethylene glycol.

The addition of diethylene glycol (B) can take place either distributed over an extended period, for example over 1 to 5 hours, continuously, uniformly or non-uniformly, or in a single shot.

The molar ratio of (B) to (A) in step a) is preferably in the range from 1.2 to 1.0 to 0.75 to 1.0.

The molar mass of the hydroxyl group-terminated polyester polyol obtained from step a) is preferably in the range between 1400 and 430, particularly preferably in the range between 1120 and 490 g/mol.

The OH value of the polyester polyol obtained from step a) is preferably in the range between 80 and 260 mg KOH/kg, preferably in the range between 100 and 230 mg KOH/kg. The OH values and the molar masses from step a) here are always the theoretical OH values or theoretical molar masses arising from the materials used in step a), and are based on the assumption that neither dioxane formed nor that free, monomeric, low-molecular-weight glycol is discharged from the reaction batch.

The molar mass of the polyester polyol obtained from step b) is preferably in the range between 750 and 350, particularly preferably in the range between 620 and 370 g/mol.

The OH value of the polyester polyol obtained from step b) is by preference in the range between 150 and 320 g KOH/kg, preferably in the range between 180 and 300 KOH/kg.

The OH value is determined by first reacting the hydroxyl end groups with a defined excess of an anhydride, for example acetic anhydride, in a sample of the polyester polyol, hydrolysing the excess anhydride and determining the content of free carboxyl groups by direct titration with a strong base, for example sodium hydroxide. The difference between carboxyl groups introduced in the form of the anhydride and the carboxyl groups found by experimentation is a measure of the number of hydroxyl groups in the sample. If this value is corrected by the number of carboxyl groups contained in the original sample as a result of incomplete esterification, i.e. by the acid value, then the OH value is obtained. The titrations, which are mostly performed with sodium hydroxide, are converted into the equivalent amount of potassium hydroxide, so the acid and hydroxyl values have the dimension g KOH/kg. The following mathematical correlation exists here between the hydroxyl value (OH#) and the number-average molecular weight (M):

$$M=(56100*F)/OH\#$$

F denotes here the number-average functionality (where the functionality relates to the number of hydroxyl groups per molecule, also referred to as the hydroxyl functionality). The hydroxyl functionality can generally be calculated from the formulation for producing the polyester polyol.

The viscosity of the polyester polyol obtained from step b) at a temperature of 50° C. is in the range between 400 and 3000 mPas, preferably in the range between 450 and 1500 mPas.

The viscosity is determined using a cone/plate viscometer, e.g. Physica MCR 51 from Anton Paar, extrapolated to a shear rate of zero. Polyols according to the invention are to the greatest possible extent not pseudoplastic.

The proportion of components (A) and (B) relative to the weight of all components is preferably in the range between 66 and 90 wt. %, particularly preferably in the range between 70 and 85 wt. %.

The polyester polyols obtained from step b) have acid values in the range from 0.5 to 3.5 mg KOH/g.

The functionality F of the polyester polyols obtained from step b) is preferably in the range from 1.9 to 3. Functionalities greater than 2 are obtained by incorporating small amounts of structural units with functionalities greater than 2, for example triols or tetraols and/or tricarboxylic or tetracarboxylic acids and/or trifunctional hydroxycarboxylic acids, during esterification. Typical representatives are glycerol, 1,1,1-trimethylolpropane, pentaerythritol, trimellitic acid, trimesic acid, malic acid, tartaric acid, citric acid, dimethylol propionic acid, etc. A functionality F in the range from 2.0 to 2.3 can preferably be established using glycerol or 1,1,1-trimethylolpropane. The viscosity measured at 25° C. deviates here by less than 20% from the value for the viscosity measured for a polyester polyol having the same functionality and hydroxyl value which other than the functionality-increasing component (for example 1,1,1-trimethylolpropane) is synthesised exclusively from phthalic anhydride and diethylene glycol.

A vacuum process is preferably used to produce the polyester polyols according to the invention, under pressures in the range from normal pressure up to 5 mbar ultimate vacuum, preferably up to 10 mbar ultimate vacuum, and at temperatures in the range from 100 to 230, preferably 180 to 215° C.

The process for producing the polyester polyols according to the invention is preferably performed by making ready all components of step a) at the same time and first condensing them under normal pressure using a protective gas at temperatures in the range from 100 to 230° C., particularly preferably at temperatures in the range from 180 to 215° C., until no further reaction water is distilled off, and then reducing the pressure over a period of 1 to 4 hours to less than 20 mbar, optionally by adding an esterification catalyst, and finally performing a polycondensation at temperatures in the range from 180 to 215° C. and under full water jet vacuum until an acid value of less than 5 g KOH/kg is obtained.

All catalysts known to the person skilled in the art can be used to produce the polyester polyols according to the invention. Tin(II) chloride and titanium tetraalkoxylates are preferably used.

The reaction of the components to produce the polyester polyol according to the invention preferably takes place in bulk.

The polyester polyols can alternatively also be produced by the nitrogen blowing method, in which the condensate is discharged from the reaction vessel by a nitrogen flow (J. H. Saunders and H. T. Frisch in Polyurethanes: Chemistry and Technology, Part I. Chemistry, InterScience published by John Wiley and Sons, New York 1962, page 45).

The present invention also provides a process for producing a PUR/PIR foam comprising the following steps:
a) reaction of a polyester polyol obtainable by the process described above with
b) a polyisocyanate-containing component,
c) a blowing agent,
d) one or more catalysts,
e) optionally flame retardants and/or further auxiliary substances and additives.

A polyisocyanate-containing component encompasses polyisocyanates.

The polyisocyanates used are isocyanates conventionally used in the polyurethane area. Suitable examples are in general aliphatic, cycloaliphatic, arylaliphatic and aromatic polyvalent isocyanates. Aromatic di- and polyisocyanates are preferably used. Preferred examples are 2,4- and 2,6-toluylene diisocyanate and mixtures of these isomers, 2,2'-, 2,4'- and 4,4'-diphenylmethane diisocyanate and any mixtures of these isomers, mixtures of 2,2'-, 2,4'-, 4,4'-diphenylmethane diisocyanates (binuclear MDI) and polyphenylenepolymethylene polyisocyanates (MDI). Mixtures of toluylene diisocyanates and MDI can alternatively also be used.

Generally known compounds having a chemical or physical action can be used as blowing agents. Water can preferably be used as a chemically acting blowing agent. Examples of physical blowing agents are (cyclo)aliphatic hydrocarbons having 4 to 8 carbon atoms, as well as HFCs and HCFCs, which evaporate under the conditions of polyurethane formation. In a preferred embodiment pentane and cyclopentane as well as mixtures of pentane and cyclopentane are used as blowing agents.

The amount of blowing agents used is largely determined by the desired density of the foams. Water is generally used in an amount from 0 to 5 wt. %, relative to the complete formulation, preferably from 0.1 to 3 wt. %. Physically acting blowing agent can generally also be used in an amount from 0 to 8 wt. %, preferably from 0.1 to 5 wt. %. Carbon dioxide, preferably dissolved as a gas in the starting components, can also be used as a blowing agent.

The conventional and known polyurethane or polyisocyanurate forming catalysts are used as catalysts for producing the polyurethane or polyisocyanurate foams according to the invention, for example organic tin compounds, such as tin diacetate, tin dioctoate, dibutyl tin dilaurate, and/or strongly basic amines such as 2,2,2-diazabicyclooctane, triethylamine or preferably triethylene diamine or bis(N,N-dimethylaminoethyl)ether, as well as potassium acetate and aliphatic quaternary ammonium salts to catalyse the PIR reaction.

The catalysts are preferably used in an amount from 0.1 to 3 wt. %, preferably 0.5 to 2 wt. %, relative to the total weight of all components.

The reaction of the aforementioned components optionally takes place in the presence of auxiliary substances and/or additives, such as for example cell regulators, release agents, pigments, reinforcing materials such as glass fibres, surface-active compounds and/or stabilisers to prevent oxidative, thermal, hydrolytic or microbial degradation or ageing. The polyurethane foams conventionally have a density of 20 to 250 g/l, advantageously 25 to 150 g/l, particularly preferably 30 to 100 g/l, most particularly preferably 35 to 75 g/l.

To produce the polyurethane foam according to the invention all components are generally mixed using conventional high-pressure or low-pressure mixing heads and reacted in amounts such that the equivalents ratio of NCO groups to the sum of reactive hydrogen atoms in the case of pure PUR foams is in the range from 0.80 to 1.00 to 1.60 to 1.00, preferably in the range from 0.90 to 1.00 to 1.15 to 1.00. A ratio of 1.00 to 1.00 corresponds here to an NCO index of 100.

In the case of PUR/PIR foams the equivalents ratio of the sum of NCO groups to reactive hydrogen atoms is in the range from 1.60 to 1.00 to 5.00 to 1.00, preferably from 2.00 to 1.00 to 4.00 to 1.00.

The present invention further provides the use of polyester polyols produced by the process described above to produce polyurethane. Polyurethane is a versatile material that is used in many areas. Owing to the great variety of raw materials which can be used, products having very diverse properties can be produced, for example rigid foams for insulation, flexible slabstock foams for mattresses, flexible moulded foams for car seats and seat cushions, acoustic foams for sound insulation, thermoplastic foams, shoe foams or microcellular foams, but also compact casting systems and thermoplastic polyurethanes.

The present invention further provides the use of a PUR/PIR foam produced by the process described above to produce metal composite elements.

Metal composite elements are sandwich elements consisting of at least two outer layers and a core layer between them. In particular, metal-foam composite elements consist of at least two metal outer layers and a core comprising a foam, for example a rigid polyurethane (PUR) foam or a rigid polyurethane/polyisocyanurate (PUR/PIR) foam. Such metal-foam composite elements are sufficiently known from the prior art and are also referred to as metal composite elements. Further layers can be provided between the core layer and the outer layers. For example the outer layers can be coated, e.g. with a paint.

Examples of the use of such metal composite elements are flat or lined wall elements and profiled roof elements for the construction of factory buildings and cold stores as well as for truck bodies, factory doors or shipping containers.

The production of these metal composite elements can take place continuously or discontinuously. Devices for continuous production are known for example from DE 1 609 668 A or DE 1 247 612 A.

In a further embodiment of the process according to the invention the polyester polyol A1) is contained in the polyol component A) in a proportion from ≥60 to ≤70 parts by weight, the polyether polyol A2) in a proportion from ≥1 to ≤10 parts by weight and the polyester polyol A3) in a proportion from ≥1 to ≤5 parts by weight. Tough foams having satisfactory adhesion and good dimensional stability can be produced with such a polyol formulation.

An example of a formulation for polyol component A) in the process according to the invention is:
Polyester polyol A1): ≥60 to ≤70 parts by weight
Polyether polyol A2): ≥1 to ≤10 parts by weight
Polyester polyol A3): ≥1 to ≤5 parts by weight
Flame retardant TCPP: ≥15 to ≤25 parts by weight
Flame retardant TEP: ≥1 to ≤5 parts by weight
Silicone-containing stabiliser: ≥2 to ≤8 parts by weight
Carboxylic acid salt (PIR catalyst): ≥3 to ≤10 parts by weight
Blowing agent: n-Pentane The present invention further relates to a polyurethane foam/polyisocyanurate foam which can be obtained by a process according to the invention. To avoid unnecessary repetitions, reference is made to the descriptions of the process according to the invention with regard to details of individual embodiments.

The foam according to the invention can be used for example in the form of rigid foam for insulation, in the form of flexible slabstock foam for mattresses, flexible moulded foam for car seats and seat cushions, acoustic foam for sound insulation, as thermoplastic foam, shoe foam or as microcellular foam.

In one embodiment of the polyurethane/polyisocyanurate foam according to the invention it has a density of $\geq 30$ kg/m$^3$ to $\leq 50$ kg/m$^3$. The density is determined in accordance with DIN EN ISO 3386-1-98. The density is preferably in a range from $\geq 33$ kg/m$^3$ to $\leq 340$ kg/m$^3$ and particularly preferably from $\geq 35$ kg/m$^3$ to $\leq 38$ kg/m$^3$.

Metal composite elements are sandwich elements consisting of at least two outer layers and a core layer between them. In particular, metal-foam composite elements comprise at least one metal outer layer and a core comprising a foam, for example a rigid polyurethane (PUR) foam or a rigid polyurethane-polyisocyanurate (PUR-PIR) foam. Such metal-foam composite elements are sufficiently known from the prior art and are also referred to as metal composite elements. Suitable metals are steel and aluminium, for example.

Examples of the use of such metal composite elements are flat or lined wall elements and profiled roof elements for the construction of factory buildings and cold stores as well as for truck bodies, factory doors or shipping containers.

The production of these metal composite elements can take place continuously or discontinuously. Devices for continuous production are known for example from DE 1 609 668 or DE 1 247 612.

Metal composite elements produced using the polyurethane/polyisocyanurate (PUR/PIR) foam according to the invention can for example have a value for total smoke production after 600 seconds TSP$_{600}$ of $\geq 45$ m$^2$ to $\leq 60$ m$^2$. The TSP$_{600}$ value can also be $\geq 46$ m$^2$ to $\leq 58$ m$^2$ or $\geq 47$ m$^2$ to $\leq 55$ m$^2$. Such metal composite elements according to EN 13823 can furthermore have a SMOGRA value for smoke production of $\geq 1$ m$^2$/s$^2$ to $\leq 10$ m$^2$/s$^2$, preferably $\geq 2$ m$^2$/s$^2$ to $\leq 8$ m$^2$/s$^2$, particularly preferably $\geq 3$ m$^2$/s$^2$ to $\leq 6$ m$^2$/s$^2$ The present invention also provides a metal composite element comprising a metal layer and a layer comprising a polyurethane/polyisocyanurate foam according to the invention. More details about metal composite elements have already been provided in relation to the use of the foam according to the invention.

In one embodiment of the metal composite element according to the invention it has a value for total smoke production after 600 seconds TSP$_{600}$ of $\geq 45$ m$^2$ to $\leq 60$ m$^2$, preferably $\geq 46$ m$^2$ to $\leq 58$ m$^2$, particularly preferably $\geq 47$ m$^2$ to $\leq 55$ m$^2$.

In a further embodiment of the metal composite element according to the invention it has a SMOGRA value for smoke production of $\geq 1$ m$^2$/s$^2$ to $\leq 10$ m$^2$/s$^2$, preferably $\geq 2$ m$^2$/s$^2$ to $\leq 8$ m$^2$/s$^2$, particularly preferably $\geq 3$ m$^2$/s$^2$ to $\leq 6$ m$^2$/s$^2$ The SMOGRA value, the TSP$_{600}$ value, the THR$_{600}$ value and the FIGRA value are determined in accordance with the standard EN 13823.

The present invention is illustrated in more detail by the examples below.

EXAMPLES

Composition of the Raw Materials Used in the Examples
Phthalic anhydride (PA): Technical PA from Lanxess Deutschland GmbH
Adipic acid: Adipic acid from BASF
Diethylene glycol (DEG): DEG from Ineos
Ethylene glycol (EG): EG from Ineos
Tin(II) chloride dihydrate from Aldrich
Analytical Methods Used:
Viscometer: MCR 51 from Anton Paar
A) Production of the Polyester Polyols

Example 1

Single-Stage Standard Process, Comparison 1437.1 g (9.71 mol) of PA were placed in a 4-litre four-necked flask, fitted with a heating mantle, mechanical stirrer, internal thermometer, 40-cm packed column, still head, descending jacketed coil condenser and dry-ice-cooled receiver, together with a diaphragm vacuum pump, under a nitrogen blanket at 140° C. and 1737.3 g (16.39 mol) of diethylene glycol were added slowly. After 1 hour the temperature was increased to 180° C., 65 mg of tin(II) chloride dihydrate were stirred in and the pressure was reduced to 700 mbar. Over the course of a further 5 hours the pressure was continuously reduced to an ultimate value of 45 mbar. The temperature was increased to 200° C., the pressure to 115 mbar and the reaction was completed up to a total running time of 27 hours. Throughout the reaction distillates were collected in a receiver cooled with dry ice. The amount of 1,4-dioxane formed was determined by gas chromatography at 17.6 g.
Analysis of the Polyester:
Hydroxyl value: 234 mg KOH/g
Acid value: 1.6 mg KOH/g
Viscosity: 11,300 mPas (25° C.), 930 mPaS (50° C.), 190 mPas (75° C.)
Amount of polyester polyol formed: 2982 g
Amount of dioxane relative to amount of polyester polyol: 17.6 g/2.982 kg=5.92 g dioxane/kg polyester
Amount of dioxane relative to amount of diethylene glycol used: 17.6 g/1.738 kg=10.16 g dioxane/kg diethylene glycol

Example 2

Two-Stage Process, According to the Invention 1444 g (9.76 mol) of PA were placed in an apparatus according to example 1 under a nitrogen blanket at 180° C. and 1193 g (11.26 mol) of diethylene glycol were added slowly. After 1 hour the temperature was lowered to 150° C. 356 g (2.44 mol) of adipic acid and 429 g (6.92 mol) of EG were added and the mixture was reacted at 200° C. for 3 hours. 65 mg of tin(II) chloride dihydrate were added and the pressure was reduced to 300 mbar. Over the course of a further 5 hours the pressure was continuously reduced to an ultimate value of 80 mbar and the reaction was completed up to a total running time of 21 hours. Throughout the reaction distillates were collected in a receiver cooled with dry ice. The amount of 1,4-dioxane formed was determined by gas chromatography at 4.8 g, the hydroxyl value at 199 mg KOH/g (calculated: 212 mg KOH/g); 160 g (1.51 mol) of diethylene glycol were added and the mixture was equilibrated under normal pressure and at 200° C. for 5 hours.
Analysis of the Polyester:
Hydroxyl value: 239.7 mg KOH/g
Acid value: 2.1 mg KOH/g
Viscosity: 8700 mPas (25° C.), 820 mPas (50° C.), 180 mPas (75° C.)
Amount of polyester polyol formed: 3315 g
Amount of dioxane relative to amount of polyester polyol: 4.8 g/3.315 kg=1.45 g dioxane/kg polyester Amount of dioxane relative to amount of diethylene glycol used: 4.8 g/1.353 kg=3.55 g dioxane/kg diethylene glycol The following terms are used below:

"Mass of ester, theoretical" means the theoretical yield of polyester polyol (excluding secondary reactions) calculated from the amounts of starting materials used.

"Mass of ester, without dioxane" means the amount of polyester polyol obtained, determined by experiment.

TABLE 1

Comparative example 1 and examples 2 to 5 according to the invention for polyester polyols with hydroxyl values in the range from 230 to 260 mg KOH/g.
20 ppm tin(II) chloride dihydrate were used as the catalyst in each case.

| | | Example 1 (comparison) | 2 | 3 | 4 | 5 |
|---|---|---|---|---|---|---|
| Mode of operation (production process) | | 1-stage | 2-stage | 2-stage | 2-stage | 2-stage |
| Phthalic anhydride (PA) | [mol] | 9.71 | 9.76 | 10.45 | 9.76 | 9.76 |
| | [g] | 1437.1 | 1444.5 | 1546.6 | 1444.5 | 1444.5 |
| Diethylene glycol (DEG) | [mol] | 16.39 | 11.26 | 10.45 | 9.76 | 8.26 |
| | [g] | 1737.3 | 1193.5 | 1107.7 | 1034.5 | 875.6 |
| Adipic acid | [mol] | | 2.44 | 1.49 | 2.44 | 2.44 |
| | [g] | | 356.2 | 217.5 | 356.2 | 356.2 |
| Ethylene glycol (EG) | [mol] | | 6.92 | 5.97 | 6.92 | 6.92 |
| | [g] | | 429 | 370 | 429 | 429 |
| DEG (amount added in step b)) | [mol] | | 1.51 | 2.9 | 3.32 | 4.43 |
| | [g] | | 160.1 | 307.4 | 351.9 | 469.6 |
| Ratio DEG/PA, step a) | [mol/mol] | 1.69 | 1.15 | 1.00 | 1.00 | 0.85 |
| Proportion (DEG + PA), total | [wt. %] | 100 | 78.1 | 83.4 | 78.3 | 78.0 |
| Proportion (DEG + PA), step a) | [wt. %] | n/a | 77.1 | 81.9 | 75.9 | 74.7 |
| Hydroxyl value | [mg KOH/g] | 234 | 239.7 | 232 | 235 | 258.7 |
| Acid value | [mg KOH/g] | 1.6 | 2.3 | 0.5 | 0.7 | 1.2 |
| Max. reaction temperature | [° C.] | 200 | 200 | 200 | 200 | 200 |
| Running time | [h] | 27 | 27 | 35 | 38 | 27 |
| Dioxane, found (distilled off) | [g] | 17.6 | 4.8 | 5.2 | 4.9 | 2.3 |
| Amount of diethylene glycol used | [g] | 1737 | 1354 | 1415 | 1386 | 1345 |
| Mass of ester, theoretical | [g] | 3000 | 3320 | 3308 | 3353 | 3311 |
| Mass of ester, without dioxane | [g] | 2982 | 3315 | 3302 | 3348 | 3309 |
| g Dioxane/kg polyester polyol | [g dioxane/kg polyester polyol] | 5.92 | 1.45 | 1.59 | 1.47 | 0.70 |
| g Dioxane/kg diethylene glycol | [g dioxane/kg diethylene glycol] | 10.16 | 3.55 | 3.70 | 3.54 | 1.72 |
| Viscosity (at 50° C.) | [mPas] | 930 | 820 | 1060 | 850 | 920 |

DEG = diethylene glycol
PA = phthalic anhydride

TABLE 2

Comparative example 6 and example 7 according to the invention for polyester polyols with hydroxyl values in the range from 280 to 300 mg KOH/g.
20 ppm tin(II) chloride dihydrate were used as the catalyst in each case.

| | | Example 6 (comparison) | 7 |
|---|---|---|---|
| Mode of operation (production process) | | 1-stage | 2-stage |
| Phthalic anhydride (PA) | [mol] | 9.35 | 9.64 |
| | [g] | 1383.8 | 1426.7 |
| Diethylene glycol (DEG) | [mol] | 17.85 | 9.64 |
| | [g] | 1892.1 | 1021.8 |
| Adipic acid | [mol] | | 2.41 |
| | [g] | | 351.9 |
| Ethylene glycol (EG) | [mol] | | 7.41 |
| | [g] | | 459.4 |
| DEG (amount added in step b)) | [mol] | | 1.34 |
| | [g] | | 142.0 |
| Ratio DEG/PA, step a) | [mol/mol] | 1.91 | 1.0 |
| Proportion (DEG + PA), total | [wt. %] | 100 | 76.2 |
| Proportion (DEG + PA), step a) | [wt. %] | n/a as 1-stage | 75.1 |
| Hydroxyl value | [mg KOH/g] | 296 | 282 |
| Acid value | [mg KOH/g] | 3.2 | 3.2 |
| Max. reaction temperature | [° C.] | 200 | 200 |
| Running time | [h] | 30 | 24 |
| Dioxane, found | [g] | 16.7 | 2.5 |
| Amount of diethylene glycol used | [g] | 1892 | 1164 |
| Mass of ester, theoretical | [g] | 3108 | 3142 |
| Mass of ester, without dioxane | [g] | 3091 | 3139 |
| g Dioxane/kg polyester polyol | [g dioxane/kg polyester polyol] | 5.40 | 0.81 |

TABLE 2-continued

Comparative example 6 and example 7 according to the invention for polyester polyols with hydroxyl values in the range from 280 to 300 mg KOH/g.
20 ppm tin(II) chloride dihydrate were used as the catalyst in each case.

| | | Example | |
|---|---|---|---|
| | | 6 (comparison) | 7 |
| g Dioxane/kg diethylene glycol | [g dioxane/kg diethylene glycol] | 8.83 | 2.18 |
| Viscosity (at 50° C.) | [mPas] | 440 | 540 |

DEG = diethylene glycol
PA = phthalic anhydride

It is clear from Tables 1 and 2 that the amount of dioxane formed can be reduced very markedly using the process according to the invention. Thus, using the standard process according to comparative example 6, for example, 5.40 g of dioxane are generated per kg of polyester polyol formed, or 8.83 g of dioxane relative to the amount of diethylene glycol used, whereas in example 7 according to the invention only 0.81 g of dioxane are generated per kg of polyester polyol, or only 2.18 g of dioxane per kg of diethylene glycol used.

The effects for the variants listed in Table 1, which differ from the examples in Table 2 substantially in terms of the OH value of the polyester polyol, are of the same quality.

B. Examples for Producing a Rigid PUR/PIR Foam

Examples 8-10

Components used
(a) Polyester polyols from comparative example 1 (CE 1) or from examples 3 and 4 according to the invention
(b) TCPP, tris(1-chloro-2-propyl)-phosphate from Lanxess GmbH, Germany.
© TEP, triethyl phosphate from Levagard.
(d) Additive 1132 from Bayer MaterialScience, containing the reaction product of phthalic anhydride and diethylene glycol with an acid value of approx. 97 mg KOH/g.
(e) PET V 657, trifunctional, polyethylene oxide polyol started on 1,1,1-trimethyolpropane with a molar mass of approx. 660 Da, from Bayer MaterialScience AG.
(f) Stabiliser, polyether-polysiloxane copolymer from Evonik.

The foam additive (b-f) listed in Table 3 consists of 20 parts by weight of component (b), 5 parts by weight of component (c), 2.2 parts by weight of component (d), 5 parts by weight of component (e) and 4 parts by weight of component (f).

Activator (g) Carboxylic acid salt (PIR catalyst): Desmorapid® VP.PU 30HB13 from Bayer MaterialScience AG, Leverkusen, Germany.
Isocyanate: (h) Desmodur® VP.PU 44V70L, polymeric polyisocyanate based on 4,4'-diphenylmethane diisocyanate with an NCO content of approx. 31.5 wt. % from Bayer MaterialScience AG, Leverkusen, Germany.

On a laboratory scale all raw materials from the rigid foam formulation with the exception of the polyisocyanate component are weighed into a cardboard beaker, heated to 23° C., mixed with a Pendraulik laboratory mixer (e.g. LM-34 from Pendraulik) and volatile blowing agent (pentane) is optionally added. The polyisocyanate component (likewise heated to 23° C.) was then added to the polyol mixture whilst stirring, the mixture was mixed intensively and the reaction mixture poured into moulds provided with metal outer layers (Corus).

After 2.5 minutes the foam hardness was determined using an indentation method and after 8 to 10 minutes the maximum core temperature was determined. The mixture was allowed to continue reacting for at least a further 24 hours at 23° C. and then the following properties were determined:

BVD test corresponding to the basic Swiss test for determining the degree of combustibility of building materials issued by the Vereinigung kantonaler Feuerversicherungen in 1988 and revised in 1990, 1994, 1995 and 2005 (available from the Vereinigung kantonaler Feuerversicherungen, Bundesstr. 20, 3011 Berne, Switzerland).

Adhesion: Determined by peeling off the foamed outer layer and determining the force required to do so using a spring balance Defects: Visual assessment of void formation after tearing off the outer layer. A distinction was made between "none" (no voids over a surface area of 1 m$^2$), "slight" (up to 5% of the surface area exhibits voids), "moderate" (5 to 20% of the surface area exhibits voids)
and "severe" void formation (over 20% of the surface area exhibits voids).

TABLE 3

Formulations and properties of the rigid foams
[parts stands for parts by weight]

| | | Example | | |
|---|---|---|---|---|
| | | 8 | 9 | 10 (comparison) |
| Component (a): | | | | |
| Polyester polyol from Ex. 4 | [parts] | 63.8 | | |
| Polyester polyol from Ex. 3 | [parts] | | 63.8 | |
| Polyester polyol from CE 1 | [parts] | | | 63.8 |
| Foam additive (b-f) | [parts] | 36.2 | 36.2 | 36.2 |
| Pentane | [parts] | 15.6 | 15.5 | 15.6 |
| Activator (g) | [parts] | 4.7 | 4.7 | 5.6 |
| Desmodur® 44V70L (h) | [parts] | 160.0 | 159.0 | 162.0 |
| Properties of the rigid foams | | | | |
| Flammability rating/ flame height | [mm] | 5/100-120 | 5/100-120 | 5/100-120 |
| Adhesion | [N] | 40 | 40 | 30 |
| Defects | | moderate | moderate | slight |
| Hardness | | 8 | 8 | 5 |
| Core temperature | [° C.] | 155 | 158 | 160 |

Examples 11 and 12

TABLE 4

Formulations of the rigid PIR foams
[parts stands for parts by weight]

| | | Example | |
|---|---|---|---|
| | | 11 | 12 |
| Component (a): | | | |
| Polyester polyol from Ex. 2 | [parts] | 64 | 64 |
| Polyether polyol based on TMP and ethylene oxide, functionality 2, OH value 240 mg KOH/g | [parts] | 5 | 5 |

TABLE 4-continued

Formulations of the rigid PIR foams
[parts stands for parts by weight]

|  |  | Example | |
|---|---|---|---|
|  |  | 11 | 12 |
| Polyester polyol consisting of phthalic anhydride and diethylene glycol, OH value 795 mg KOH/g | [parts] | 2.2 | 2.2 |
| Tris(1-chloro-2-propyl) phosphate, TCPP (b) | [parts] | 20 | 20 |
| Triethyl phosphate, TEP (c) | [parts] | 5 | 5 |
| Stabiliser (f) | [parts] | 4 | 6 |
| Pentane | [parts] | 15 | 15 |
| Activator (g) | [parts] | 5 | 5 |
| Desmodur ® 44V70L (h) |  | + | + |
| Index (characteristic) |  | 360 | 360 |

With densities (ISO 845) in the range from 40 to 41 kg/m$^3$, the rigid foams obtained in accordance with examples 11 and 12 had the following properties:
Tensile strengths: 0.14 N/mm$^2$ (DIN 53292), tensile modulus (DIN 53292): 6.4 N/mm$^2$
Compressive stress: (DIN 53291): 0.15 N/mm$^2$, compressive modulus (DIN 53291): 4.3 N/mm$^2$
Shear strength (DIN 12090): 0.19 N/mm$^2$ and shear modulus (DIN 12090): 3.8 N/mm$^2$ The rigid foams according to the invention from examples 11 and 12 were also tested with regard to fire behaviour in the single burning item (SBI) test in accordance with EN 13823. To this end commercial metal composite elements were produced with metal composite elements containing the rigid foam according to the invention according to example 11 or 12 (see examples 17 and 18) and with comparative foams (comparative examples 13 to 16) and subjected to the test. The results shown in Table 5 below were obtained:

TABLE 5

Composition and properties of the metal composite elements

|  | Example | | | | | |
|---|---|---|---|---|---|---|
|  | 13 (comparison) | 14 (comparison) | 15 (comparison) | 16 (comparison) | 17 | 18 |
| Foam system | PUR B2 | PUR B2 | PIR A | PIR B | PIR C from example 11 | PIR D from example 12 |
| Panel type |  |  |  |  |  |  |
| Polyol basis of foam system | Polyether polyol | Polyether polyol | Mixture of polyester polyol (not according to the invention) and polyether polyol | Polyester etherol | Polyester polyol according to Ex 2 | Polyester polyol according to Ex 2 |
| OH value | 340 | 340 | 240 | 170 | 180 | 180 |
| Index | 140 | 140 | 200 | 330 | 360 | 360 |
| FIGRA [W/s] | 26 | 81 | 42 | 47 | 42 | 29 |
| THR$_{600}$ [MJ] | 3.4 | 7.6 | 4.0 | 3.8 | 3.5 | 2.8 |
| SMOGRA [m$^2$/s$^2$] | 25 | 58 | 16 | 10 | 9 | 4 |
| TSP$_{600}$ [m$^2$] | 293 | 606 | 177 | 143 | 113 | 53 (47)* |
| Class | B/S3/D0 | C/S3/D0 | B/S2/D0 | B/S2/D0 | B/S2/D0 | B/S2/D0 |

*Repeat test

For the FIGRA value (fire growth rate) a value below 250 W/s is rated as class C and a value below 120 W/s as class B. For the THR$_{600}$ value (total heat release after 600 seconds) a value below 15 MJ is rated as class C and a value below 7.5 MJ as class B. A SMOGRA value (smoke growth rate) below 180 m$^2$/s$^2$ is rated as class S2 and below 30 m$^2$/s$^2$ as class S1. A TSP$_{600}$ value (total smoke production after 600 seconds) below 200 m$^2$ is rated as class S2 and below 50 m$^2$ as class S1.

A metal composite element (examples 17 and 18) produced with the foam according to the invention has by far the lowest TSP$_{600}$ value within the tested systems. In the case of the metal composite element of example 18 a TSP$_{600}$ value of just 53—and just 47 when the test was repeated—was achieved, which is rated as class S1. The low THR$_{600}$ and SMOGRA values should likewise be emphasised. The rigid foam according to the invention thus exhibits a very favourable fire behaviour overall.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyester polyol comprising:
   a) mixing and reacting
      (A) at least one carboxylic anhydride,
      (B) diethylene glycol,
      and at least one of
      (C) (i) $C_2$-$C_4$ glycol, other than diethylene glycol, and (ii) an aliphatic $C_5$-$C_{12}$ dicarboxylic acid
      or
      (D) (i) a $C_5$-$C_{10}$ glycol and (ii) at least one $C_4$ dicarboxylic acid
      to form an intermediate polyester polyol and
   b) adding more (B) diethylene glycol to the reacted mixture produced in step a) to form the polyester polyol product,
   wherein a molar ratio of (B) to (A) in step a) is from 1.5:1 to 0.7:1, the amounts of (A) plus (B) in step a) constitute from 66 to 90% by weight of total weight of (A)

plus (B) plus (C)(i) plus (C)(ii) plus (D)(i) plus (D)(ii), and the intermediate polyester polyol product from step a) has a higher molar mass than the product polyester polyol from step b).

2. The process of claim 1 in which (A) is selected from the group consisting of phthalic anhydride, trimellitic anhydride and pyromellitic anhydride.

3. The process of claim 1 in which (C)(i) is selected from the group consisting of ethylene glycol, 1,3-propanediol, 2-methyl-1,3-propanediol, and 1,2-propanediol.

4. The process of claim 1 in which (C)(ii) is selected from the group consisting of glutaric acid, adipic acid, pimelic acid, suberic acid, azelaic acid, sebacic acid, undecanedioic acid and dodecanedioic acid.

5. The process of claim 1 in which (D)(i) is selected from the group consisting of 1,5-pentanediol, 3-methyl-1,5-pentanediol, 1,6-hexanediol and 1,8-octanediol.

6. The process of claim 1 in which (D)(ii) is selected from the group consisting of succinic acid, fumaric acid and maleic acid.

7. The process of claim 1 in which the molar ratio of components (B) to (A) in step a) is in the range from 1.2 to 1.0 to 0.75 to 1.0.

8. The process of claim 1 in which the polyester polyol obtained from step a) has a theoretical OH value in the range between 80 and 260 KOH/kg.

9. The process of claim 1 in which the polyester polyol obtained from step b) has an OH value in the range between 150 and 320 g KOH/kg.

10. The polyester polyol produced by the process of claim 1.

* * * * *